(12) United States Patent
Lu et al.

(10) Patent No.: US 11,214,329 B2
(45) Date of Patent: Jan. 4, 2022

(54) TELESCOPING AND FOLDABLE ELECTRIC VEHICLE

(71) Applicant: JIANGSU JINPENG VEHICLE CO., LTD., Xuzhou (CN)

(72) Inventors: Shimin Lu, Xuzhou (CN); Jianxin Wang, Xuzhou (CN); Hongjun Zhu, Xuzhou (CN); Zhaoqin Li, Xuzhou (CN)

(73) Assignee: JIANGSU JINPENG VEHICLE CO., LTD., Xuzhou (CN)

(*) Notice: Subject to any disclaimer, the term of this patent is extended or adjusted under 35 U.S.C. 154(b) by 233 days.

(21) Appl. No.: 16/076,493

(22) PCT Filed: May 16, 2017

(86) PCT No.: PCT/CN2017/084545
§ 371 (c)(1),
(2) Date: Mar. 13, 2020

(87) PCT Pub. No.: WO2018/161434
PCT Pub. Date: Sep. 13, 2018

(65) Prior Publication Data
US 2020/0239099 A1 Jul. 30, 2020

(30) Foreign Application Priority Data
Mar. 10, 2017 (CN) .......................... 201710142198.0

(51) Int. Cl.
*B62K 15/00* (2006.01)
*B62K 5/06* (2006.01)
*B62K 5/027* (2013.01)

(52) U.S. Cl.
CPC ............... *B62K 15/00* (2013.01); *B62K 5/06* (2013.01); *B62K 15/006* (2013.01); *B62K 5/027* (2013.01); *B62K 2015/003* (2013.01)

(58) Field of Classification Search
CPC ............................ B62K 15/00; B62K 15/006; B62K 2015/003; B62K 5/02; B62K 5/023; B62K 5/025; B62K 5/027; B62K 5/06
See application file for complete search history.

(56) References Cited

U.S. PATENT DOCUMENTS

| | | | | |
|---|---|---|---|---|
| 4,695,071 A | * | 9/1987 | Johnston | A61G 5/023 280/204 |
| 5,064,209 A | * | 11/1991 | Kurschat | B62K 27/003 280/204 |

(Continued)

FOREIGN PATENT DOCUMENTS

| | | |
|---|---|---|
| CN | 2464899 Y | 12/2001 |
| CN | 103818504 A | 5/2014 |

(Continued)

OTHER PUBLICATIONS

PCT/CN2017/084545 International Search Report and Written Opinion, dated Nov. 7, 2017.

*Primary Examiner* — Laura Freedman
(74) *Attorney, Agent, or Firm* — Lei Fang; Smith Tempel Blaha LLC

(57) ABSTRACT

The present invention relates to a telescoping and foldable electric vehicle, belonging to the field of traffic tools, comprising a front frame (1), a rear frame (2), a power supply and a controller, and also comprising a foldable pedal (3) and a locking assembly (4) for locking the front frame (1) and the rear frame (2), wherein the front frame (1) and the rear frame (2) are in a sliding connection, the front frame (1) is equipped with a front seat (1-1), and the rear frame (2) is equipped with a rear seat (2-1); the front frame (1) is equipped with a front fork (1-2); the front fork (1-2) is equipped with a front wheel (1-3); the rear frame (2) is equipped with a rear bridge (2-1); the rear bridge (2-1) is equipped with rear wheels (2-2); the rear bridge (2-1) is (Continued)

provided with a driving motor (2-3); and the foldable pedal (3) is arranged between the front frame (1) and the rear frame (2). The present invention can reduce the size of the vehicle body, realizes two forms on one vehicle, and can conveniently enter into elevators and houses. The telescoping and foldable electric vehicle of the present invention is purely operated with electricity, has a simple structure, and is conveniently controlled.

5 Claims, 3 Drawing Sheets

(56) References Cited

U.S. PATENT DOCUMENTS

| | | | | |
|---|---|---|---|---|
| 6,530,445 | B1 * | 3/2003 | Flowers | B62K 5/025 |
| | | | | 180/208 |
| 7,249,779 | B2 * | 7/2007 | Ehrenreich | B62B 7/04 |
| | | | | 280/278 |
| 7,341,121 | B2 * | 3/2008 | Flowers | B62D 11/003 |
| | | | | 180/6.28 |
| 7,967,095 | B2 * | 6/2011 | Kosco | H01M 50/20 |
| | | | | 180/208 |
| 10,328,988 | B2 * | 6/2019 | Bang | B62K 11/10 |
| 10,729,603 | B2 * | 8/2020 | Wang | A61G 5/0841 |
| 10,773,767 | B2 * | 9/2020 | Zhang | B62K 15/008 |
| 2012/0242059 | A1 * | 9/2012 | Wu | B62K 15/00 |
| | | | | 280/287 |
| 2016/0089285 | A1 * | 3/2016 | Cheng | B62K 5/007 |
| | | | | 180/58 |
| 2019/0168837 | A1 * | 6/2019 | Zhang | B62K 15/006 |

FOREIGN PATENT DOCUMENTS

| | | | |
|---|---|---|---|
| CN | 105197157 A | | 12/2015 |
| CN | 205131501 U | | 4/2016 |
| CN | 205675170 U | * | 11/2016 |
| WO | 2005069778 A2 | | 8/2005 |

* cited by examiner

TELESCOPING AND FOLDABLE ELECTRIC VEHICLE

CROSS-REFERENCE TO RELATED APPLICATIONS

This application is a 371 U.S. National Phase of PCT International Application No. PCT/CN2017/084545, filed on May 16, 2017, which claims benefit and priority to Chinese patent application No. 201710142198.0, filed on Mar. 10, 2017. Both of the above-referenced applications are incorporated by reference herein in their entirety.

BACKGROUND OF THE INVENTION

Technical Field

The present invention relates to an electric vehicle, particularly to a telescoping and foldable electric vehicle, belonging to the technical field of traffic tools.

Description of Related Art

As an environmentally-friendly, clean and important energy source with a high conversion rate, electricity is widely applied to production and living. Using electricity to drive traffic tools updates, so as to promote the low-carbon development of the traffic transportation industry, reduce the traffic costs, save energy, and protect the environment, creates one of the key research subjects in the world. Electric tricycles, with the advantages of high applicability, high mobility, flexibility, simple service, convenient maintenance and low price etc., can flexibly run on narrow and small roads and have been widely applied to short-distance transportations fields involving household use, urban-suburban transportation, individual leasing, factory use, mineral zone use, environmental sanitation, and community cleaning.

As the living standard of people gets higher, common electric tricycles with only basic functions fail to meet the demands of people. Electric tricycles with two or more seats are already available on the market. However, such electric tricycles are relatively large and heavy, causing inconvenience in storage and movement to users, especially the old, and have difficulties in entering elevators and houses.

BRIEF SUMMARY OF THE INVENTION

In order to solve the problems above, the present invention provides a telescoping and foldable electric vehicle which can reduce the body size, realize two forms on one vehicle, and can be conveniently taken into elevators and houses. The telescoping and foldable electric vehicle of the present invention is purely operated with electricity, has a simple structure, and is conveniently controlled.

In order to achieve the objective above, the present invention employs the following technical scheme: a telescoping and foldable electric vehicle, which includes a front frame, a rear frame, a power supply and a controller, and also includes a foldable pedal and a locking assembly for locking the front frame and the rear frame, wherein the front frame and the rear frame are in a sliding connection, the front frame is equipped with a front seat, and the rear frame is equipped with a rear seat; wherein the front frame is equipped with a front fork, and the front fork is equipped with a front wheel; wherein the rear frame is equipped with a rear bridge, the rear bridge is equipped with rear wheels, the rear bridge is provided with a driving motor, and the foldable pedal is arranged between the front frame and the rear frame.

Further, the locking assembly includes a locking motor, a locking handle, locking connecting rods, locking sliding rods and limiting slot blocks; wherein the locking motor is in a drive connection with an output shaft in a gear drive or worm drive arrangement, the middle portion of the locking handle is connected with a spline of the output shaft, each one of the two ends of the locking handle is hinged with one end of each corresponding one of the locking connecting rods, the other end of each one of the two locking connecting rods is hinged with one end of each corresponding one of the locking sliding rods, and the suspending end of each one of the locking sliding rods passes through a fixing block; wherein the limiting slot blocks are symmetrically arranged on the front frame on the left and right sides, with one pair of the limiting slot blocks setting on the front limiting position and another pair of the limiting slot blocks setting on the rear limiting position, and the limiting slot on each one of the limiting slot blocks is matched with the end portion of the suspending end of each corresponding one of the locking sliding rods; and the locking motor and the fixing blocks are installed on the rear frame.

Further, the foldable pedal includes two symmetrical longitudinal beams on the left and right sides and a plurality of crossbeams; each one of the longitudinal beams consists of a front beam, a middle beam and a rear beam; the front, middle and rear beams are hinged in sequence; the front beams and the rear beams are equal in length; the front end of each one of the front beams is hinged with the front frame, and the rear end of each one of the rear beams is hinged with the rear frame.

Further, the locking assembly also includes a travel switch installed on the rear frame; the drive shaft or the locking handle is fixedly equipped with a positioning member; and when the end portion of each one of the locking sliding rods is clamped into the limiting slot on each corresponding one of the limiting slot blocks, the positioning member contacts the travel switch.

Further, a forward-backward chute is arranged on the outer side of each one of the left and right longitudinal beams of the front frame; three support shafts are arranged on each one of the left and right longitudinal beams of the rear frame; the shaft end, facing the inner side of the frame, of each one of the support shafts is in a interference fit with a slide bearing, and each one of the slide bearings is placed in the chute of each corresponding one of the longitudinal beams of the front frame.

Further, the rear frame is symmetrically provided with four guide wheels on the left and right sides, and each one of the guide wheels is tangent to the edge, facing the inner side of the frame, of each corresponding one of the longitudinal beams of the front frame.

In the present invention, the front frame and the rear frame are in a sliding connection, realizing adjustment to the length of the whole vehicle; the locking assembly locks the front and rear frames when the front and rear frames move toward each other to the limit positions, ensuring the safety and reliability of the whole vehicle; the match between the locking assembly and the driving motor ensures the integration of telescoping and driving operations, which means that the frames can perform telescoping and one vehicle has two forms without adding a complicated telescoping mechanism, thus simplifying structure and saving cost. The telescoping and foldable electric vehicle is purely operated with electricity, does not need manual operation, is conveniently operated, and runs reliably.

DETAILED DESCRIPTION OF THE INVENTION

The present invention is further described in conjunction with the attached drawings (in the following description, the left and right directions, the upper and lower directions, and the forward and backward directions are identical with the left and right directions, the upper and lower directions, and the forward and backward directions of a running electric vehicle).

Figure 1:
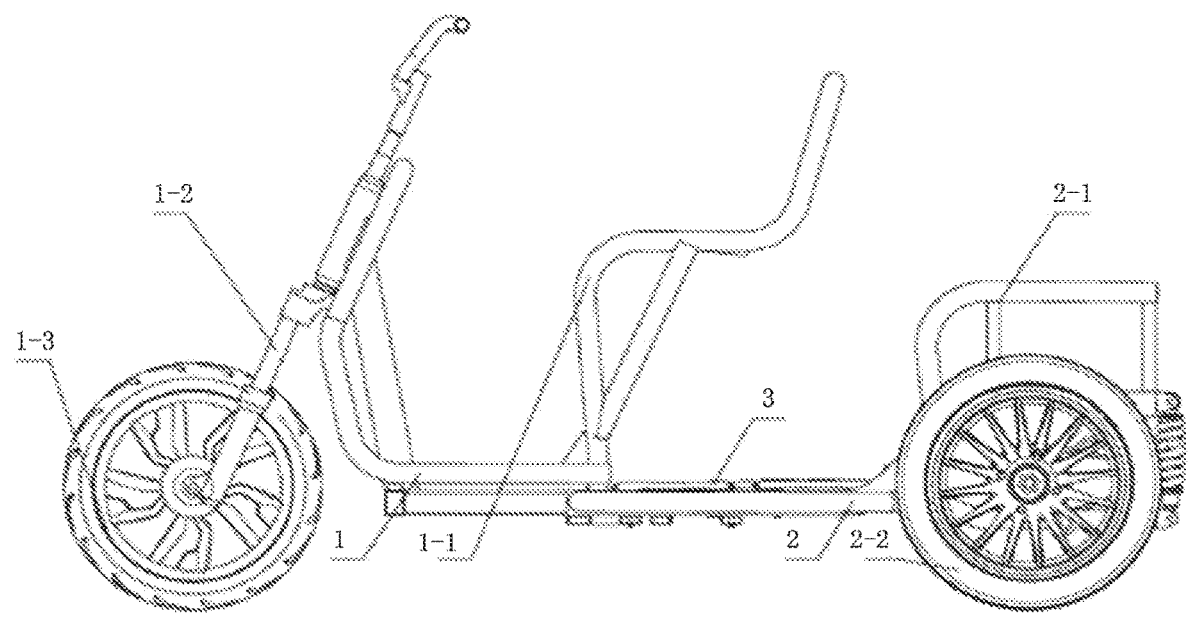
FIG. 1 is the front view of the present invention.
Figure 2:
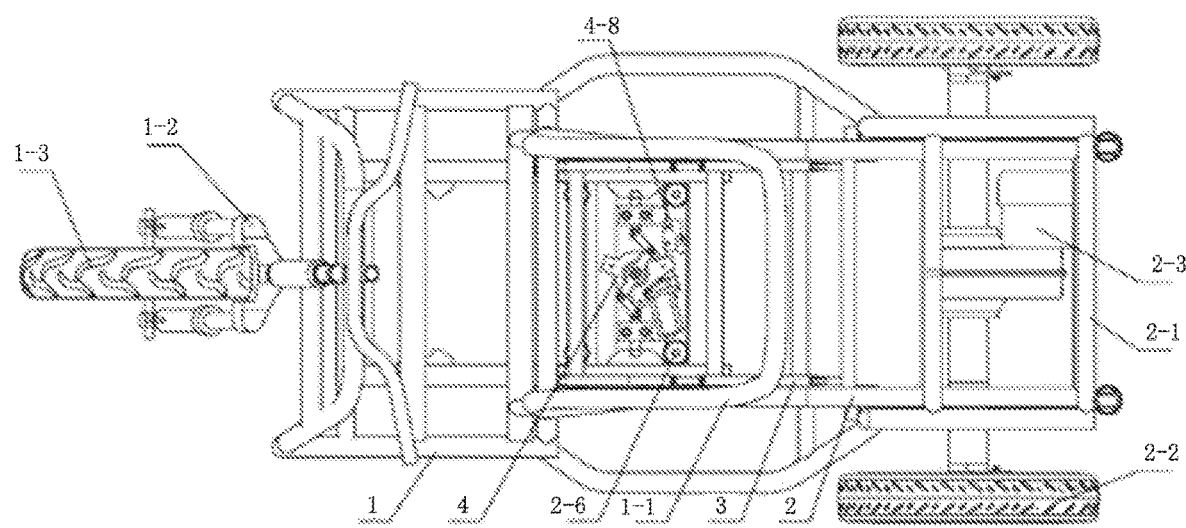
FIG. 2 is the top view of FIG. 1.
Figure 3:
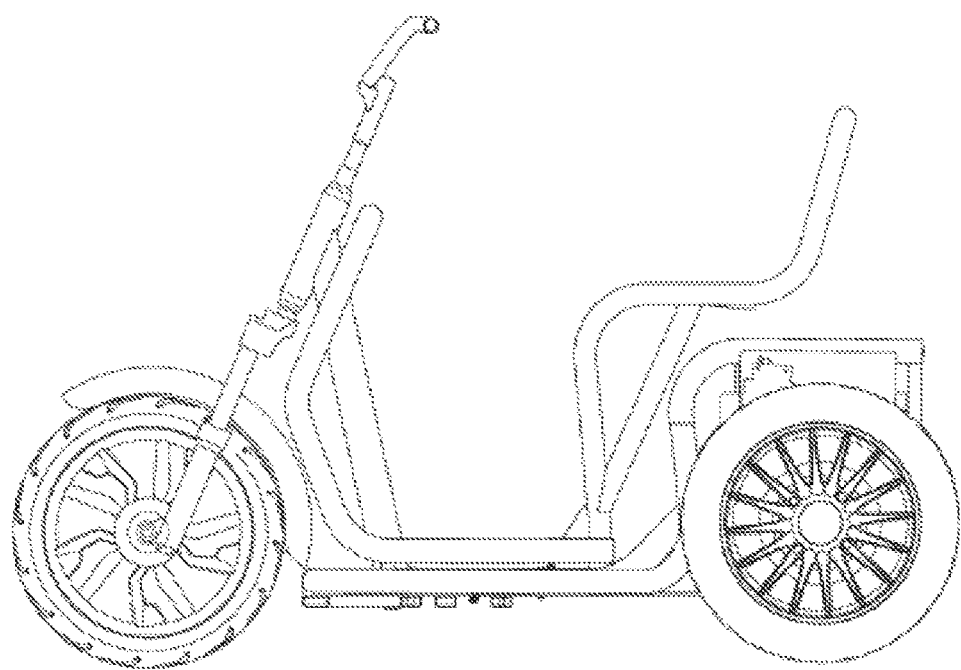
FIG. 3 is the schematic view of the present invention after folding.

As shown in FIG. 1-3, a telescoping and foldable electric vehicle includes a front frame 1, a rear frame 2, a power supply and a controller, and also includes a foldable pedal 3 and a locking assembly 4 for locking the front frame 1 and the rear frame 2, wherein the front frame 1 and the rear frame 2 are in a sliding connection, the front frame 1 is equipped with a front seat 1-1, and the rear frame 2 is equipped with a rear seat 2-1; wherein the front frame 1 is equipped with a front fork 1-2 through a front main pipe, the front fork 1-2 is equipped with a front wheel 1-3; wherein the rear frame 2 is equipped with a rear bridge 2-1, the rear bridge 2-1 is equipped with rear wheels 2-2, the rear bridge 2-1 is provided with a driving motor 2-3, and the foldable pedal 3 is arranged between the front frame 1 and the rear frame 2. To fold the electric vehicle, the locking assembly 4 is opened to force the front and rear frames to move relative to each other; the front wheel brake is activated to brake the front wheel 1-3; then, the driving motor 2-3 is started to move forward; when the driving motor 2-3 drives the rear frame 2 to move forward to a limit position relative to the front frame 1, the locking assembly 4 locks the front frame 1 and the rear frame 2. To unfold the electric vehicle, the locking assembly 4 is opened to force the front and rear frames to move relative to each other; the front wheel brake is activated to brake the front wheel 1-3; then, the driving motor 2-3 is started to move reversely; when the driving motor 2-3 drives the rear frame 2 to move backward to the limiting position relative to the front frame 1, the locking assembly 4 locks the front frame 1 and the rear frame 2. In this way, the telescoping operation of the electric vehicle is electrically controlled without manual labor of the operator, bringing convenience and saving labor.

Figure 4:
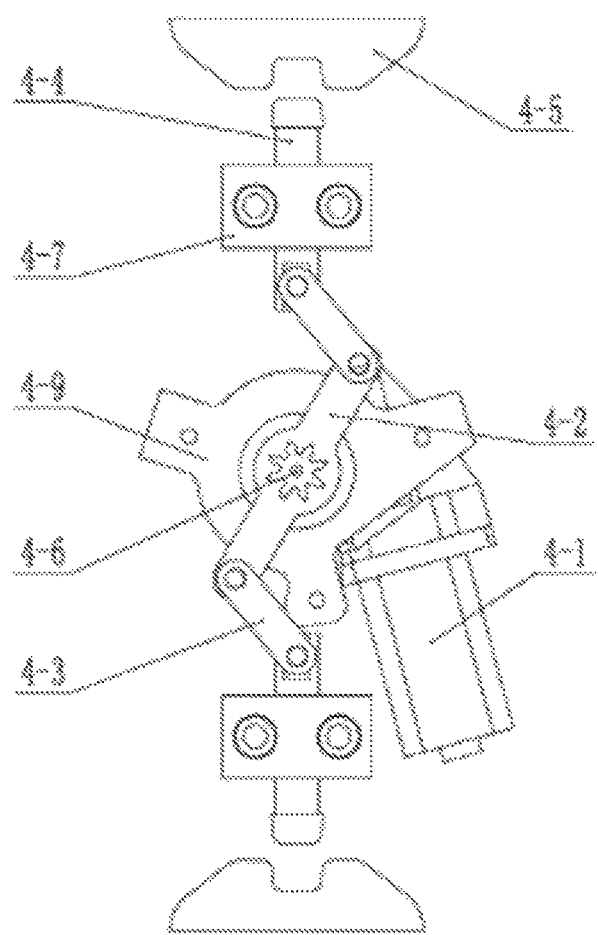
FIG. 4 is the structural view of the locking assembly.

As shown in FIG. 2 and FIG. 4, the locking assembly 4 includes a locking motor 4-1, a locking handle 4-2, locking connecting rods 4-3, locking sliding rods 4-4 and limiting slot blocks 4-5; wherein the locking motor 4-1 is in a drive connection with an output shaft 4-6 in a gear drive or worm drive arrangement, the middle portion of the locking handle 4-2 is connected with a spline of the output shaft 4-6, each one of the two ends of the locking handle 4-2 is hinged with one end of each corresponding one of the locking connecting rods 4-3, the other end of each one of the two locking connecting rods 4-3 is hinged with one end of each corresponding one of the locking sliding rods 4-4, the suspending end of each one of the locking sliding rods 4-4 passes through a fixing block 4-7; wherein the limiting slot blocks 4-5 are symmetrically arranged on the front frame 1 on the left and right sides, with one pair of the limiting slot blocks setting on the front limiting position and another pair of the limiting slot blocks setting on the rear limiting position, and the limiting slot on each one of the limiting slot blocks 4-5 is matched with the end portion of the suspending end of each corresponding one of the locking sliding rods 4-4; and the locking motor 4-1 and the fixing blocks 4-7 are fixedly installed on the rear frame 2. To lock the front and rear frames, the locking motor 4-1 is started; then, the locking motor 4-1 drives the drive shaft 4-6 to rotate, then drives the locking handle 4-2 to rotate and next drives each one of the locking sliding rods 4-4 to move toward each corresponding one of the limiting slot blocks 4-5 until the end portion of each one of the locking sliding rods 4-4 is clamped into each corresponding one of the limiting slots, and then the locking motor 4-1 is stopped from running; and if it is not required to lock the front and rear frames, the locking motor 4-1 is reversely started to release the front and rear frames. The locking assembly is obtained through the structure of a crankshaft slide, and is simple in structure and reliable in locking.

Figure 5:
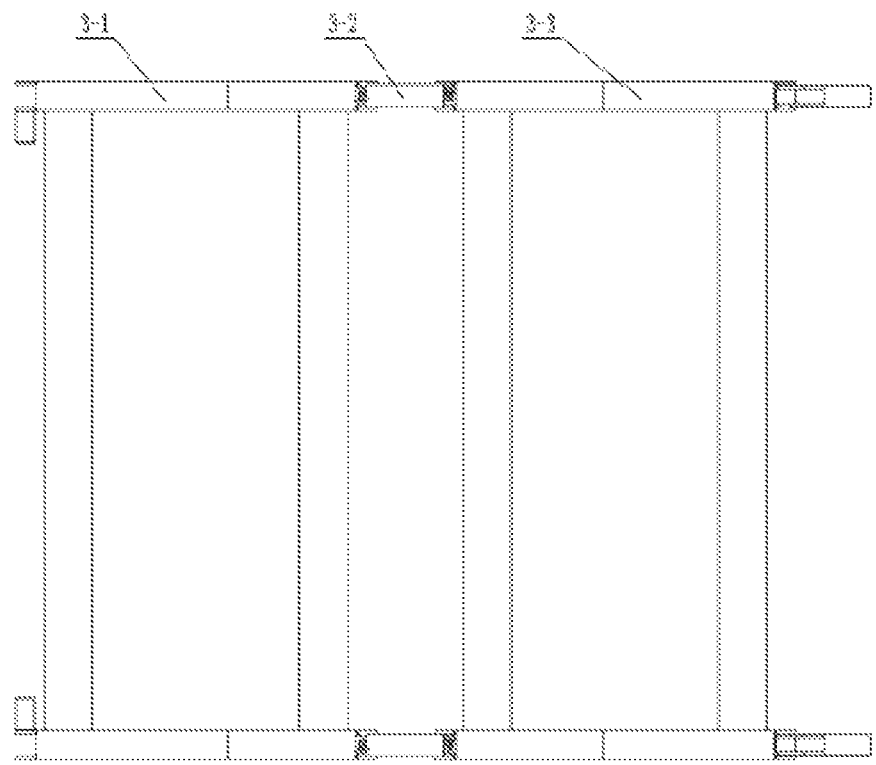
FIG. 5 is the structural view of the foldable pedal.

As shown in FIG. 2 and FIG. 5, the foldable pedal 3 includes two symmetrical longitudinal beams on the left and right sides and a plurality of crossbeams; each one of the longitudinal beams consists of a front beam 3-1, a middle beam 3-2 and a rear beam 3-3, the front, middle and rear beams are hinged in sequence; the front beams 3-1 and the rear beams 3-3 are equal in length; the front end of each one of the front beams 3-1 is hinged with the front frame 1, and the rear end of each one of the rear beams 3-3 is hinged with the rear frame 2. When the front frame 1 and the rear frame 2 are folded, the foldable pedal 3 is also folded, and when the front frame 1 and the rear frame 2 are unfolded, the foldable pedal 3 is also unfolded, bringing convenience to users.

As shown in FIG. 2 and FIG. 4, the locking assembly 4 also includes a travel switch 4-8 installed on the rear frame 2; the drive shaft 4-6 or the locking handle 4-2 is fixedly equipped with a positioning member 4-9; when the end portion of each one of the locking sliding rods 4-4 is clamped into the limiting slot on each corresponding one of the limiting slot blocks 4-5, the positioning member 4-9 contacts the travel switch 4-8. When the front and rear frames are locked, the locking motor is automatically powered off through the travel switch without requiring judgment by people, thus bringing convenience to operators.

Figure 6:
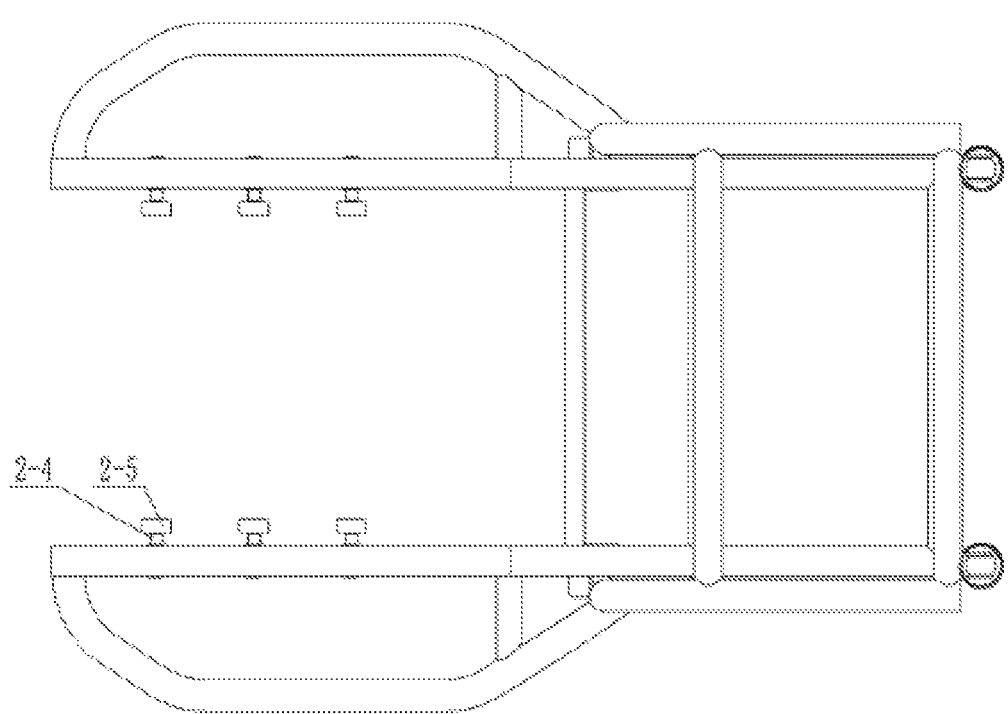
FIG. 6 is the schematic view of parts of the rear frame.
As shown in the drawings: 1. front frame; 1-1. front seat; 1-2. front fork; 1-3. front wheel; 2. rear frame; 2-1. rear seat; 2-2. rear wheel; 2-3. driving motor; 2-4. support shaft; 2-5 slide bearing; 2-6. guide wheel; 3. foldable pedal; 3-1. front beam; 3-2. middle beam; 3-3. rear beam; 4. locking assembly; 4-1. locking motor; 4-2. locking handle; 4-3 locking connecting rod; 4-4 locking sliding rod; 4-5 limiting slot block; 4-6 output shaft; 4-7. fixing block; 4-8. travel switch; 4-9. positioning member.

As shown in FIG. 6, a forward-backward chute is arranged on the outer side of each one of the left and right longitudinal beams of the front frame 1; three support shafts 2-5 are arranged on each one of the left and right longitudinal beams of the rear frame 2; the shaft end, facing the inner side of the frame, of each one of the support shafts 2-5 is in a interference fit with a slide bearing 2-4, and each one of the slide bearings 2-4 is placed in the chute of each corresponding one of the longitudinal beams of the front frame 1. The front frame 1 and the rear frame 2 slide in the chutes of the slide bearings 2-4 to realize relative moment. Such structure realizes sliding connection through rolling of the bearings, avoiding excessive wear of the front and rear frames caused by rigid contact.

As shown in FIG. 2, the rear frame 2 is symmetrically provided with four guide wheels 2-6 on the left and right sides; the guide wheels 2-6 are tangent to the edge, facing the inner side of the frame, of each one of the longitudinal beams of the front frame 1 to prevent the front frame 1 and the rear frame 2 from shifting during relative movement, thus avoiding wearing of the frames and reduction of the safety and comfort of the whole vehicle.

What is claimed is:

1. A telescoping and foldable electric vehicle, comprising a front frame (1), a rear frame (2), a power supply and a controller, further comprising a foldable pedal (3) and a locking assembly (4) for locking the front frame (1) and the rear frame (2), wherein the front frame (1) and the rear frame (2) are in a sliding connection, and
    the front frame (1) is equipped with a front seat (1-1),
    the rear frame (2) is equipped with a rear seat (2-1),
    the front frame (1) is equipped with a front fork (1-2),
    the front fork (1-2) is equipped with a front wheel (1-3),
    the rear frame (2) is equipped with a rear bridge (2-1),
    the rear bridge (2-1) is equipped with rear wheels (2-2),
    the rear bridge (2-1) is provided with a driving motor (2-3), and
    the foldable pedal (3) is arranged between the front frame (1) and the rear frame (2), wherein
    the locking assembly (4) includes a locking motor (4-1), a locking handle (4-2), locking connecting rods (4-3), locking sliding rods (4-4) and limiting slot blocks (4-5), wherein
    the locking motor (4-1) is in a drive connection with an output shaft (4-6) in gear drive or worm drive arrangement,
    a middle portion of the locking handle (4-2) is connected with a spline of the output shaft (4-6), each one of two ends of the locking handle (4-2) is hinged with one end of each corresponding one of the locking connecting rods (4-3), the other end of each one of the two locking connecting rods (4-3) is hinged with one end of each corresponding one of the locking sliding rods (4-4),
    a suspending end of each one of the locking sliding rods (4-4) passes through a fixing block (4-7), and
    wherein the limiting slot blocks (4-5) are symmetrically arranged on the front frame (1) on left and right sides, with one pair of the limiting slot blocks (4-5) arranged on a front limiting position and another pair of the limiting slot blocks (4-5) arranged on a rear limiting position,
    a limiting slot on each one of the limiting slot blocks (4-5) is matched with an end portion of the suspending end of each corresponding one of the locking sliding rods (4-4), and
    the locking motor (4-1) and the fixing blocks (4-7) are fixedly installed on the rear frame (2).

2. The telescoping and foldable electric vehicle according to claim 1, wherein the foldable pedal (3) comprises two symmetrical longitudinal beams, one beam on each of the left and right sides, and a plurality of crossbeams; and wherein
    each one of the longitudinal beams consists of a front beam (3-1), a middle beam (3-2) and a rear beam (3-3), and the front, middle and rear beams are hinged in sequence;
    the front beams (3-1) and the rear beams (3-3) are equal in length,
    a front end of each one of the front beams (3-1) is hinged with the front frame (1), and
    a rear end of each one of the rear beams (3-3) is hinged with the rear frame (2).

3. The telescoping and foldable electric vehicle according to claim 2, wherein
    the locking assembly (4) also comprises a travel switch (4-8) installed on the rear frame (2),
    the drive shaft (4-6) or the locking handle (4-2) is fixedly equipped with a positioning member (4-9), and
    when the end portion of each one of the locking sliding rods (4-4) is clamped into the limiting slot on each corresponding one of the limiting slot blocks (4-5), the positioning member (4-9) contacts the travel switch (4-8).

4. The telescoping and foldable electric vehicle according to claim 3, wherein a forward-backward chute is arranged on an outer side of each one of left and right longitudinal beams of the front frame (1); three support shafts (2-5) are arranged on each one of left and right longitudinal beams of the rear frame (2); a shaft end, facing an inner side of the rear frame, of each one of the support shafts (2-5) is in a interference fit with a slide bearing (2-4), and each one of the slide bearings (2-4) is placed in the chute of each corresponding one of the longitudinal beams of the front frame (1).

5. The telescoping and foldable electric vehicle according to claim 4, characterized in that the rear frame (2) is symmetrically provided with four guide wheels (2-6) on the left and right sides; the guide wheels (2-6) are tangent to an edge, facing the inner side of the rear frame, of each one of the longitudinal beams of the front frame (1).

* * * * *